Sept. 22, 1953  H. C. CRANDALL  2,653,090

GLASS STRAND REINFORCED PAPER

Filed May 13, 1948

Inventor
Henry C. Crandall
by The Firm of Charles W. Hills Attys

Patented Sept. 22, 1953

2,653,090

UNITED STATES PATENT OFFICE 2,653,090

GLASS STRAND REINFORCED PAPER

Henry C. Crandall, Mosinee, Wis., assignor to Mosinee Paper Mills Company, Mosinee, Wis., a corporation of Wisconsin Application May 13, 1948, Serial No. 26,827

4 Claims. (Cl. 92—3)

This invention relates to a reinforced paper and a method for preparing the same.

In the past, paper has been reinforced with strands of material such as manila, jute, silk, cotton, and the like. One method of preparing such a reinforced paper has been disclosed in United States Patent No. 1,870,267 to Norman S. Stone and Robert L. Burns. The disadvantages of reinforced papers heretofore known lie in their relatively low tensile strength and in the rough surface produced by the relatively thick reinforcing material embedded in the body of the paper.

One object of the present invention is to prepare a reinforced paper having a tensile strength greater than that possessed by reinforced paper used heretofore.

Another object of the present invention is to prepare reinforced paper containing reinforcing strands of a relatively small diameter, thus making possible a paper having a relatively smooth surface.

It is to be understood that the term "paper" as used herein comprises material such as sulphate paper, cardboard, fiber board, and the like.

I have found that a reinforced paper having improved characteristics may be produced by incorporating strands of glass yarn coated with a thermoplastic resin binder within the body of the paper.

To illustrate the product of the present invention, reference is made to the drawings in which.

Figure 1:
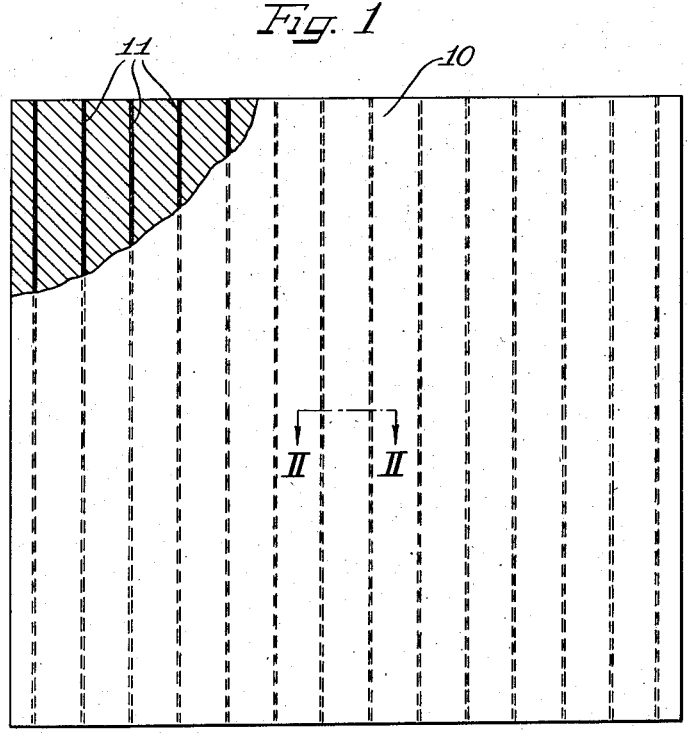
Figure 1 shows a plan view of a sheet of the reinforced paper.
Figure 2:
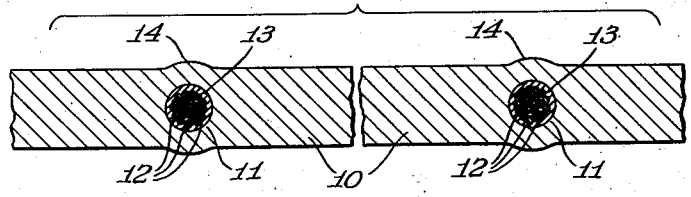
Figure 2 shows a highly magnified cross sectional view of a section taken along the line II—II of Fig. 1.

The drawings show a body of relatively stiff paper, such as kraft, or sulfate paper, designated by the reference numeral 10 containing a plurality of strands 11 of twisted glass fibers 12 coated with a thermoplastic resin, indicated at 13. The strands are embedded in the paper completely enclosed by the fibers of the paper and extending in parallel rows in the machine direction of the paper. In general, the strands are more or less equi-spaced. The incorporation of the glass strands in the paper body gives rise to very slight surface ribbing indicated by the ribs 14.

The reinforcing materials to be used in accordance with this invention consist preferably of a plurality of very fine diameter glass fibers 12 twisted into strands 11. The diameter of these strands is normally less than $\frac{1}{32}$ of an inch.

To secure adhesion between the glass fibers themselves and between the glass strands and the paper fibers, the glass strands are coated and impregnated with a thermoplastic resin. The properties desirably possessed by a thermoplastic resin to be used in accordance with the present invention are: (1) the resinous coating must have ability to adhere to glass; (2) it must be substantially insoluble in water; (3) the resinous material must be fusible at the temperature at which the paper composition is dried, normally below 212° F.; and (4) the resinous material must be capable of being bonded to the paper fibers.

The thermoplastic resin to be utilized is preferably a thermoplastic alkyd resin, a coumarone-indene resin, a rosin ester, or a hydrogenated rosin or rosin ester. Rosin esters exhibit especially desirable properties for use in bonding the glass fiber strands with the adjoining paper fibers. Among the rosin esters which may be used are the rosin esters of glycerol and other polyhydric alcohols, or monohydric alcohols, or phenols. Especially useful are the alkyd type resins derived from rosin. The rosin esters should have a softening point below about 212° F. I have found that the incorporation of from 5% to about 30% by weight of the glass yarn of a rosin ester having a melting point below 212° F. yields a reinforced paper having a higher tensile strength and a lower basis weight per unit of tensile strength than papers reinforced with material such as jute, cotton and the like.

The resinous coating may be applied in any of a number of manners, one of which consists of drawing the strands of glass fibers through a molten body of thermoplastic resin and allowing the material to set into a plastic coating. Alternatively, a spool of the glass yarn may be bodily immersed in the molten thermoplastic, or a solution thereof, and then removed and allowed to cool or the solvent allowed to evaporate.

The reinforced paper may be made in a continuous process on a paper making machine of the Fourdrinier type. This type of machine is well known in the art and may be described briefly as comprising a head box through which the paper stock flows under an overlying slice to an endless wire screen supported by a series of table rolls and then through a system of presses. The pressure exerted by these presses may vary from about 100 to about 250 pounds per linear inch. It has been found that pressures somewhat higher than those used in preparing jute reinforced papers are necessary to secure good adhesion between the glass yarn and the paper fibers. Strands of the reinforcing material may be introduced from a series of bobbins into the paper stock before the stock passes onto the endless wire screen. Other methods of preparing the reinforced paper of the present invention will be apparent to those skilled in the art and it is not my intention to limit the scope of this invention to any single method.

An advantage of the reinforced papers of the present invention over conventional reinforced papers of the jute type lies in the possibility of using lower basis weight paper for the same purposes that previously required high basis weight paper. A length of glass yarn treated with from 5% to 30% by weight of a thermoplastic resin weighs about ⅓ as much as an equal length of jute fiber of lower tensile strength. The glass yarn reinforced paper of the present invention may have a weight in the range from 100-150 pounds per ream consisting of 500 sheets of paper 24 inches by 36 inches. The lowest basis weight of jute reinforced paper that is practical with a standard 12 lb. jute twine is about 200 pounds.

Another distinct advantage of the glass yarn reinforced sheets is the minimum amount of "ribbing" caused by the insertion of the reinforcing strands. A glass yarn reinforced paper having a maximum thickness of 0.027 inch has a minimum, or body thickness of 0.025 inch, so that when the paper is passed through driers, the body of the paper is just 0.0010 inch from the drier surface, permitting a much faster drying rate than that possible with conventional reinforced paper. Commercial jute reinforced paper has a maximum thickness of 0.035 inch and a body thickness of 0.022 inch, so the surface of the drier will be 0.0065 inch from the body of the paper.

The facility in handling glass yarn fibers as compared to handling fibers of vegetable origin is also very pronounced. Vegetable fiber yarns are not uniform in diameter or strength, so that breaks in the yarn occur rather frequently while the yarn is being handled. On the other hand, glass yarn is much more uniform, both in diameter and strength.

To illustrate the marked improvement of the glass yarn reinforced paper of the present invention over jute reinforced paper, the following tensile strength test was made.

A kraft paper reinforced with glass yarn coated with 14.8% by weight of a rosin ester having a melting point of 104° F. by the drop method, was tested in a Schopper tensile tester. In this test, a strip of reinforced paper 9 inches long, containing one glass strand, is trimmed to a length of 7 inches, leaving a 2 inch exposure of glass yarn. The exposed glass yarn is clamped between the jaws of the testing apparatus, and the bottom of the sheet is clamped securely, care being taken to avoid clamping the embedded end of the glass yarn. The force necessary to extract the 7 inches of embedded glass yarn is then measured.

The aforementioned glass yarn reinforced paper, with a maximum thickness of 0.027 inch and a minimum thickness of 0.025 inch required a tensile pull of 12.1 pounds to liberate the glass yarn, while a jute reinforced paper having a maximum thickness of 0.035 inch required a pull of between 5 and 5.5 pounds to liberate the fiber.

I claim as my invention:

1. A relatively flexible reinforced paper comprising a plurality of flexible spaced parallel glass yarn strands contained within and wholly covered by a surrounding matrix of an integrated felted web of paper fibers, the glass strands running in one direction substantially the length of the sheet in that direction and having a continuous thin coating of 5-30 weight percent thereof of a thermoplastic adhesive substance secured thereto and which coating secures the glass strands to the adjoining fibers of said web.

2. A flexible reinforced paper sheet comprising a plurality of parallel flexible glass fiber strands wholly covered by a surrounding web of integrated felted paper fibers, all of the glass yarn strands running in one direction substantially the length of the sheet in that direction and said strands having a thin continuous coating of 5-30 weight percent thereof of a rosin ester which secures the glass yarn strands to adjacent paper fibers of said web.

3. A reinforced paper sheet of 0.025-0.027 inch thickness and 100-150 pounds per ream weight, consisting essentially of a plurality of parallel flexible glass yarn strands of less than $\frac{1}{32}$ inch diameter wholly covered by a surrounding web of integrated felted paper fibers, the glass yarn strands running in one direction substantially the length of the sheet in that direction and having a thin continuous coating of 5-30 weight percent thereof of a rosin ester impregnating the strands and which secures the strands to adjacent paper fibers of said web.

4. A reinforced kraft paper sheet comprising a plurality of parallel flexible glass fiber strands wholly covered by a surrounding web of integrated felted paper fibers, all of the glass yarn strands running in one direction substantially the length of the sheet in that direction and said strands having a thin continuous coating of 14.8 weight percent thereof of a rosin ester having a melting point of 104° F., which rosin ester secures the glass yarn strands to immediate adjacent paper fibers of said web.

HENRY C. CRANDALL.

References Cited in the file of this patent

UNITED STATES PATENTS

| Number | Name | Date |
|---|---|---|
| 127,463 | Crane | June 4, 1872 |
| 1,550,041 | Noonan | Aug. 18, 1925 |
| 1,615,428 | Willard | Jan. 25, 1927 |
| 1,644,050 | Cady | Oct. 4, 1927 |
| 1,748,998 | Richter | Mar. 4, 1930 |
| 1,870,267 | Stone et al. | Aug. 9, 1932 |
| 1,909,521 | Bryant | May 16, 1933 |
| 1,921,504 | Chase et al. | Aug. 8, 1933 |
| 1,934,589 | Cannard | Nov. 7, 1933 |
| 2,133,183 | Baird et al. | Oct. 11, 1938 |
| 2,148,490 | Millspaugh | Feb. 28, 1939 |
| 2,286,807 | Johannessen | June 16, 1942 |
| 2,325,302 | Britt | July 27, 1943 |
| 2,354,110 | Ford et al. | July 18, 1944 |
| 2,389,678 | Merrell | Nov. 27, 1945 |
| 2,457,775 | Ebaugh | Dec. 28, 1948 |

FOREIGN PATENTS

| Number | Country | Date |
|---|---|---|
| 483,769 | Great Britain | Apr. 26, 1938 |
| 497,059 | Great Britain | Dec. 8, 1938 |
| 551,127 | Great Britain | Feb. 9, 1943 |